United States Patent [19]
Germain

[11] 3,980,843
[45] Sept. 14, 1976

[54] ROTARY ELECTRIC SWITCH IN PARTICULAR FOR AN AUTOMOBILE VEHICLE LUGGAGE BOOT

[75] Inventor: Yves Germain, Hericourt, France

[73] Assignees: Automobiles Peugeot, Paris; Regie Nationale des Usines Renault, Boulogne-Billancourt, both of France

[22] Filed: Feb. 26, 1975

[21] Appl. No.: 553,316

[30] Foreign Application Priority Data
Mar. 11, 1974 France .................. 74.08219

[52] U.S. Cl. .................. 200/11 EA; 200/11 K; 200/61.62; 200/155 R
[51] Int. Cl.² .................. H01H 3/16; H01H 21/28
[58] Field of Search .............. 200/11 R, 11 E, 11 C, 200/11 EA, 11 G, 11 H, 11 J, 11 K, 61.62, 61.7, 155 R, 155 A, 61.85–61.9

[56] References Cited
UNITED STATES PATENTS

| | | | |
|---|---|---|---|
| 2,205,482 | 6/1940 | Krieger | 200/11 EA |
| 2,802,911 | 8/1957 | Johnson | 200/11 EA |
| 3,157,756 | 11/1964 | Close et al. | 200/155 X |
| 3,263,033 | 7/1966 | Metzger | 200/11 K X |
| 3,439,325 | 4/1969 | Leichsenring | 200/61.89 X |
| 3,591,740 | 7/1971 | Kolster | 200/11 J X |
| 3,692,992 | 9/1972 | Bain et al. | 200/61.62 X |

*Primary Examiner*—James R. Scott
*Attorney, Agent, or Firm*—Burns, Doane, Swecker & Mathis

[57] ABSTRACT

The switch comprises a body carrying fixed electric contacts and a movable member rotatably mounted in the body. The body has curved ribs of identical radius which extend around a barrel and define between them a plurality of free spaces containing electrically conductive balls. At least two of the spaces are partly occupied by the fixed contacts. An electrically conductive ring is interposed between the balls and elastically yieldable members carried by the base of the movable element. The conductive ring is put in contact with the fixed contacts through the balls, which constitute moving contacts, and closes the switch electrically when the movable element is rotated relative to the body. The edges of the ribs constitute abutments for the balls.

7 Claims, 6 Drawing Figures

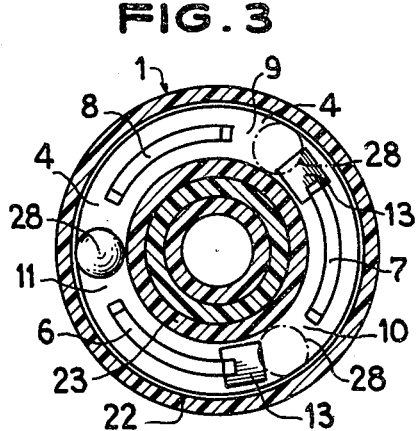
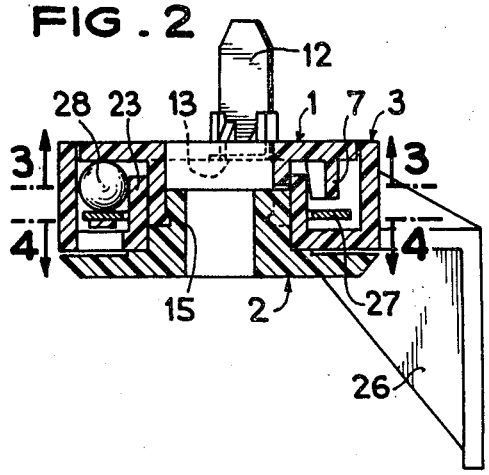
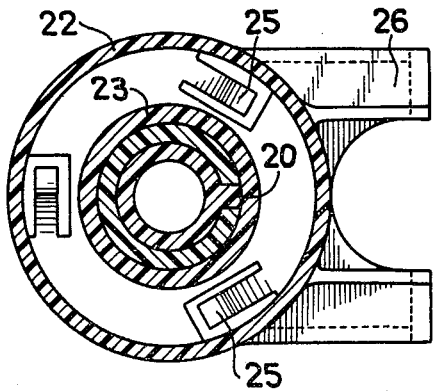
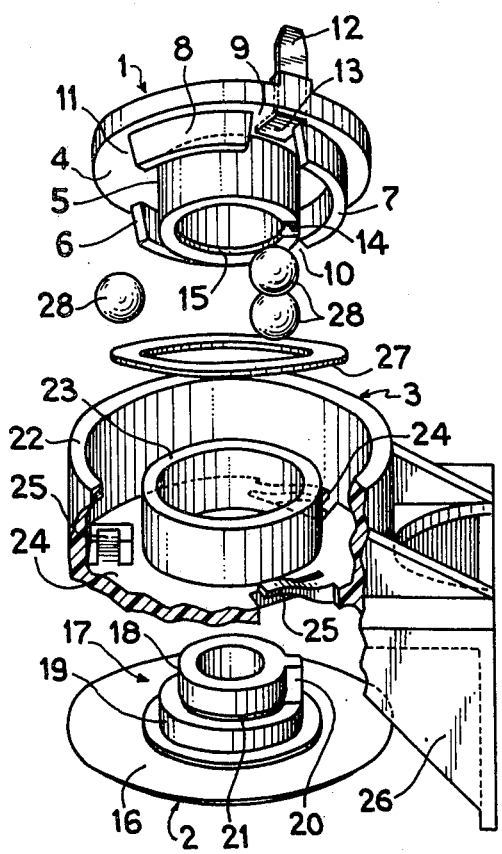

ROTARY ELECTRIC SWITCH IN PARTICULAR FOR AN AUTOMOBILE VEHICLE LUGGAGE BOOT

The present invention relates to electric switches and more particularly to switches for controlling the lighting of the luggage boot or compartment of an automobile vehicle.

The luggage boot of an automobile vehicle is generally provided with a light supplied with current by the battery of the vehicle, this light being adapted to light up when the lid of the luggage boot is raised. For this purpose, the supply circuit of the light comprises a pushbutton switch the opening of which is achieved by the fact that a moving part presses on the pushbutton.

However, it could occur that, owing to manufacturing tolerances, the travel of the pushbutton of the switch is insufficient to break the circuit when the lid of the luggage boot is lowered, so that the light remains on when the boot is closed. This malfunctioning cannot be ascertained.

An object of the present invention is to overcome the aforementioned drawback by providing a switch which is reliable in operation and ensures the faultless breaking of the supply circuit of the luggage boot illuminating light of an automobile vehicle.

According to the invention, there is provided a rotary electric switch comprising a body carrying fixed contacts and a movable element rotatably mounted on the body and provided with moving contacts adapted to cooperate with the fixed contacts of the body and ensure the closing and opening of the switch, wherein the body has a portion in the form of a disc which is apertured in its centre and a barrel, curved ribs of the same radius being disposed evenly around the barrel and defining therebetween free spaces at least two of which spaces are partly occupied by the fixed contacts of the body, said moving element has an inner ring and an outer ring interconnected by a base, a conductive ring is disposed on the base through elastically yieldable means and capable of being put into electrical contact, upon rotation of the movable element, with the fixed contacts of the body through conductive balls constituting said moving contacts disposed in said free spaces, the edges of the ribs constituting abutments for said balls.

Further features of the invention will be apparent from the ensuing description with reference to the accompanying drawings given solely by way of example and in which:

FIG. 1 is an exploded perspective view, with a part cut away, of the rotary electric switch according to the invention;

FIG. 2 is an elevational and sectional view of the switch shown in FIG. 1;

FIG. 3 is a sectional view taken on line 3—3 of FIG. 2;

FIG. 4 is a sectional view taken on line 4—4 of FIG. 2;

Figure 5:
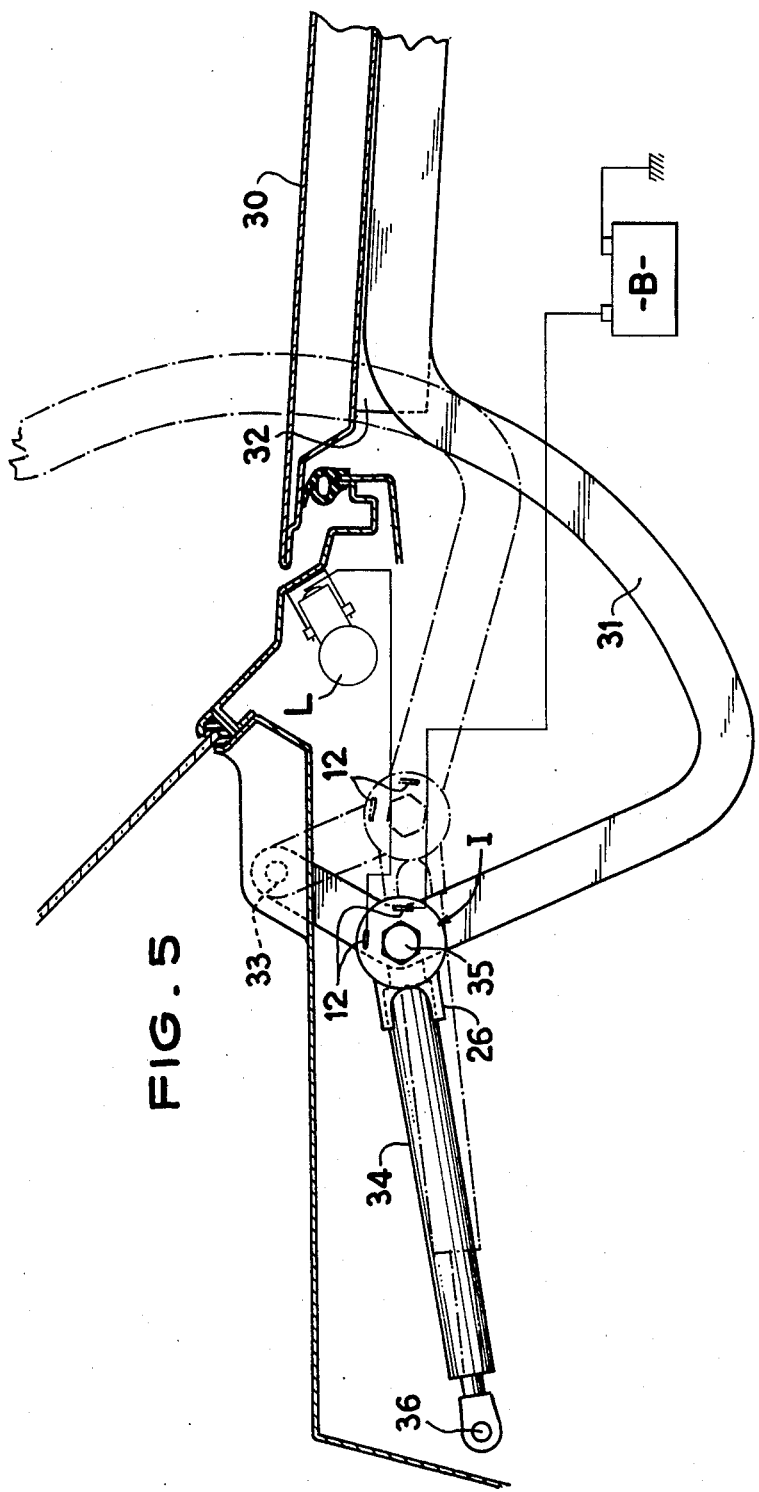
FIG. 5 is a diagramatic elevational view of a hinge mechanism of the lid of a luggage boot of an automobile vehicle equipped with the switch according to the invention, and, FIG. 6 is a partial plan view of the mechanism shown in FIG. 5.

The rotary switch shown in FIG. 1 comprises mainly a body 1, a cover 2 and a movable element 3 which is mounted to be rotatable between the body and the cover. These two elements of the switch are made from insulating material, for example plastics material.

The body 1 has a portion 4 in the shape of a disc having an aperture in its centre and a barrel 5 which is integral with the body and has the same axis as the disc. Adjacent the barrel the portion 4 is provided with three curved ribs 6, 7, 8, having the same radius, free spaces 9, 10, 11 of about one-eighth of the circumference being defined between each pair of ribs.

In two of the spaces thus defined, for example in the spaces 9 and 10, there are disposed metal strips such as 12 which are bent at a right-angle, one of the branches 13 of each strip being flush with the surface of the disc-shaped portion 4 in the corresponding free space, the other branch extending through the portion 4 and projecting from the latter on the side opposed to the barrel 5.

The strip 12 shown in FIG. 1 is nearer to the rib 7 than to the rib 8.

The strips are secured to the body 1, for example by being moulded with the body or by any other suitable means. The barrel 5 of the body is provided with a recess 14 and an inner annular rib 15, better seen in FIG. 12, is adapted to secure the body 1 to the cover 2 as concerns rotation and movement in translation.

The cover 2 has a disc-shaped portion 16 having an aperture in its centre and a barrel 17 integral with the cover. The outer surface of the barrel 17 has a portion of smaller diameter which is connected to the portion 16 by a portion 19 of large diameter.

The portion 18 is provided with a lug 20 adapted to cooperate with the recess 14 in the barrel 5 of the body 1.

An annular groove 21 is provided at the base of the small portion 18 to receive the annular rib 15 provided at the end of the inner surface of the barrel 5.

The movable element 3, adapted to be maintained between the body 1 and the cover 2, consists of an outer ring 22 whose inside diameter is slightly larger than the outside diameter of the portion 4 of the body 1, an inner ring 23 whose inside diameter is lightly larger than the outside diameter of the barrel 5 of the body 1 and of the portion 19 of the barrel 17 of the cover 2, the rings 22 and 23 being interconnected by a base 24. The latter is provided with three elastically yieldable strips 25 disposed 120° apart and projecting between the rings 22 and 23.

The movable element 3 also has a driving tab 26 having two branches secured to the outer ring 22.

The switch according to the invention is completed by a metal ring 27, for example of brass, adapted to be placed on the strips 25 and to cooperate with three balls 28, also of brass, disposed in the free spaces 9 to 11 defined between the ribs 6 to 8 of the body 1.

The assembled switch is shown in FIG. 2.

To assemble the switch, the movable element 3 is placed on the cover 2 in such manner that the portion 19 of the barrel 17 fits in the inner ring 23 of the cover. The ring 27 is placed on the strips 25 provided on the base 24 of the movable element. The three brass balls 28, spaced about 120° apart, are disposed on the ring 27 and then the barrel 5 of the body 1 is engaged in such manner that its recess 14 engages with the lug 20 on the barrel 17 of the cover. By exerting an additional force on the body 1 and the cover 2, the rib 15 of the barrel 5 clips into the annular groove 21 of the barrel 17 so that the body 1 is prevented from moving in translation or rotating with respect to the cover 2 while the movable element 3 is free to rotate.

The switch just described operates in the following manner:

The assembly constituted by the body 1 and the cover 2 is maintained fixed. The movable element 3 is driven in rotation by its tab 26 and the balls 28 are driven in rotation by ffriction against the disc-shaped portion 4 of the body 1 and the ring 27. These balls are thus brought into contact with the strips 12 or with the non-conductive part of the free space 9, 10, 11 between two ribs 6, 7, 8.

When the balls are in contact with the branches 13 of the strips 12, they establish a conductive path for the current between two strips 12 through the ring 27. The contact is ensured with a small rotational travel of the element 3.

On the other hand, the lost motion of the switch is large since the balls 28 which are each trapped between two neighbouring ribs do not prevent the movable element 3 from rotating when they abut an edge of a rib.

When the movable element 3 is rotated in the opposite direction, the contact is broken with a short travel. Thus when the switch is mounted in the supply circuit of an illuminating light of a luggage boot of an automobile vehicle, it can ensure the breaking of the supply circuit right from the start of the closing movement of the lid so that it is easy to verify that this light goes out when the luggage boot is closed.

Figure 6:
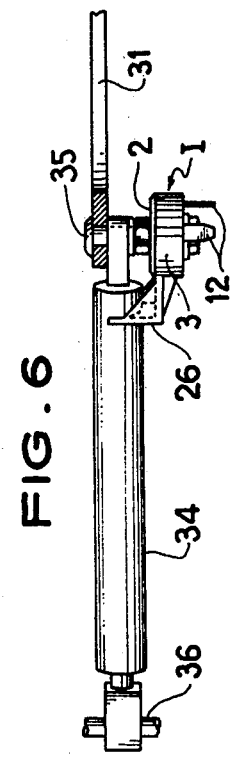

FIGS. 5 and 6 show the manner in which the switch according to the invention is disposed for controlling the illuminating light L of the luggage boot of an automobile vehicle, the light L being supplied with current by the battery B of the vehicle.

The lid 30 of the luggage boot of an automobile vehicle is hinged to the rest of the body by two curved swan-neck shaped members 31 disposed on the sides of the boot.

Each member 31 is welded at one end to the lining 32 of the lid 30 and mounted at its opposite end on a fixed pin 33 to pivot about the latter. It is also connected to another fixed point of the boot by a compensating jack 34 whose body is pivotably mounted on a pin 35 and whose rod is pivotably mounted on a fixed pin 36.

The switch I according to the invention is also mounted on the pin 35 which pivots the body of the jack 34 to the swan-neck member 31. It is secured by nuts on a screwthreaded part of the pin 35.

The tab 26 of the movable element 3 is mounted astride the body of the compensating jack 34. The strips 12 constitute the connecting terminals of the switch.

FIG. 5 shows in full line and dot-dash line the respective positions of the switch I when the lid 30 of the luggage boot is closed and opened.

It will be observed that variation in the angle between the member 31 and the compensating jack 34 causes actuation of the switch I.

However, it will be understood that the rotary switch according to the invention may be mounted on any pivotable connection between two parts which undergo a relative angular movement.

I claim:

1. A rotary electric switch comprising in combination a body having a disc configuration, electric contacts fixed relative to the body, a movable element having a base and rotatably mounted in the body, the body comprising a barrel integral with the disc and defining an aperture in the centre of the disc, curved ribs integral with the disc and of substantially identical radii substantially evenly spaced around the barrel and defining between the ribs free spaces at least two of which free spaces are partly occupied by the fixed contacts, electrically conductive balls disposed in the spaces, said ribs having edges which limit said spaces and act as abutments for said balls, said movable element including an inner ring and an outer ring interconnected by said base, said inner ring of said movable element surrounding said barrel of said body, elastically yieldable means carried by said base, an electrically conductive ring bearing against the elastically yieldable means, the balls being interposed between the conductive ring and the disc and being capable of contacting the fixed contacts upon rotation of the movable element so that the electrical connection between said fixed contacts is established through said balls and said conductive ring, said switch further comprising means for maintaining said movable element assembled with said body.

2. A switch as claimed in claim 1, wherein said means for maintaining the movable element assembled with the body comprise a cover having a disc-shaped portion defining an aperture in its centre and a barrel portion having a portion of small diameter which is engaged in the barrel of the body, a recess in the barrel of the body, a lug carried by the cover and engaged in the recess, an annular groove in said portion of small diameter and an annular rib provided inside the barrel of the body and engaged in the annular groove, whereby the cover is prevented from rotating and moving in translation relative to the body.

3. A switch as claimed in claim 1, wherein the fixed contacts of the body are arranged in a dissymetrical manner in the free spaces so as to be nearer to one rib than to the other rib defining the corresponding space.

4. A switch as claimed in claim 1, wherein said elastically yieldable means interposed between the base of the movable element and the conductive ring are strips integral with the base, and projecting upwards therefrom.

5. A switch as claimed in claim 1, wherein said movable element has a lug for rotating the movable element with respect to the body.

6. A switch as claimed in claim 1 applied to the control of the power supply to a light for illuminating the luggage boot of an automobile vehicle when opening the lid of the luggage boot, wherein the body and the movable element of the switch are respectively secured to members of a hinge for the lid of the boot which members undergo a relative angular displacement when the lid is opened and closed.

7. A structure comprising in combination, a luggage boot lid, a hinge for the lid which hinge comprises two relatively movable members, a rotary switch for opening and closing a power supply circuit for a boot-illuminating light when the lid is closed and opened respectively, the switch comprising in combination a body, electric contacts fixed relative to the body for insertion in said supply circuit, a movable element rotatably mounted in the body, the body comprising a disc, a barrel integral with the disc, the body defining an aperture in the centre of the disc, curved ribs integral with the disc and of substantially identical radii substantially evenly spaced around the barrel and defining between the ribs free spaces at least two of which free spaces are partly occupied by the fixed contacts, electrically conductive balls disposed in the spaces, elastically yieldable means carried by the base, an electrically conductive ring bearing against the elastically yieldable means, the balls being interposed between the conductive ring and the disc and being capable of contacting the fixed contacts upon rotation of the movable element so that the conductive ring is put into electrical contact with the fixed contacts through the balls, the ribs having edges acting as abutments for the balls, one of said two members being connected to the body of the switch and the other of said two members being connected to the movable element of the switch.

* * * * *